United States Patent
Kalous (10) Patent No.: US 10,378,240 B2
(45) Date of Patent: Aug. 13, 2019

(54) EAC SYSTEM WITH PLURALITY OF DIFFERENT ALGORITHM/OPERAND PAIRS HAVING DIFFERENT FUNCTIONALITY

(71) Applicant: Master Lock Company LLC, Oak Creek, WI (US)

(72) Inventor: D. Scott Kalous, Kenosha, WI (US)

(73) Assignee: Master Lock Company LLC, Oak Creek, WI (US)

( * ) Notice: Subject to any disclaimer, the term of this patent is extended or adjusted under 35 U.S.C. 154(b) by 451 days.

(21) Appl. No.: 14/950,009

(22) Filed: Nov. 24, 2015

(65) Prior Publication Data

US 2016/0145902 A1 May 26, 2016

Related U.S. Application Data (60) Provisional application No. 62/084,849, filed on Nov. 26, 2014.

(51) Int. Cl.
| | |
|---|---|
| *E05B 47/00* | (2006.01) |
| *H04L 9/16* | (2006.01) |
| *G05B 15/02* | (2006.01) |
| *G07C 9/00* | (2006.01) |

(52) U.S. Cl.
CPC .......... *E05B 47/0001* (2013.01); *G05B 15/02* (2013.01); *G07C 9/00142* (2013.01); *G07C 9/00174* (2013.01); *H04L 9/16* (2013.01); *G07C 9/0069* (2013.01); *G07C 2209/04* (2013.01); *G07C 2209/08* (2013.01)

(58) Field of Classification Search
CPC . E05B 47/0001; G05B 15/02; G07C 9/00174; G07C 9/0069; G07C 2209/04; G07C 2209/08; H01L 9/16

USPC ............................................. 700/275
See application file for complete search history.

(56) References Cited

U.S. PATENT DOCUMENTS

| | | |
|---|---|---|
| 5,731,575 A | 3/1998 | Zingher |
| 8,635,159 B1 | 1/2014 | Cobb |
| 2004/0103287 A1 | 5/2004 | Newby |
| 2005/0022005 A1* | 1/2005 | McKeeth ................ G06F 21/31 726/26 |
| 2006/0075230 A1* | 4/2006 | Baird, III .............. H04L 63/083 713/168 |
| 2007/0015490 A1 | 1/2007 | Munje et al. |
| 2008/0077798 A1* | 3/2008 | Nachtigall .............. G06F 21/31 713/184 |
| 2009/0247123 A1 | 10/2009 | Lee |
| 2009/0249496 A1* | 10/2009 | Ohgushi ................. G06F 21/31 726/34 |
| 2013/0024918 A1* | 1/2013 | Cramer ............... H04L 63/0838 726/6 |

FOREIGN PATENT DOCUMENTS

WO  2014/125243 A1  8/2014

OTHER PUBLICATIONS

International Search Report and Written Opinion from PCT Application No. PCT/US2015/062252 dated Mar. 23, 2016.

* cited by examiner

*Primary Examiner* — Dzung Tran (74) *Attorney, Agent, or Firm* — Calfee, Halter & Griswold, LLP (57) ABSTRACT

The present application discloses systems and methods of providing different functionality to EAC devices using multiple algorithm/operand pairs, each tied to one or more different functions.

16 Claims, 3 Drawing Sheets

EAC SYSTEM WITH PLURALITY OF DIFFERENT ALGORITHM/OPERAND PAIRS HAVING DIFFERENT FUNCTIONALITY

CROSS-REFERENCE TO RELATED APPLICATION

This application claims priority to, and the benefit of, U.S. Provisional Patent Application Ser. No. 62/084,849, entitled "EAC SYSTEM WITH PLURALITY OF DIFFERENT ALGORITHM/OPERAND PAIRS HAVING DIFFERENT FUNCTIONALITY" and filed Nov. 26, 2014, the entire contents of which are incorporated herein by reference, to the extent that they are not conflicting with the present application.

BACKGROUND

The present application generally relates to the field of electronic access control ("EAC") devices. The present disclosure relates more specifically to systems and methods of providing different functionality to EAC devices using multiple algorithm/operand pairs, each tied to one or more different functions.

Some EAC systems use rolling codes or one-time-passcodes. The basic premise with these is that a code-generating computer that generates the access code (e.g., a central computer or a handheld computer) and an EAC device into which the code is entered (e.g., an EAC lock) each have the same algorithm programmed into them, have the same unique "secret" value for that algorithm stored in them, and have the same "counter" starting value for that algorithm stored in them. Each time the EAC device is to be accessed, (1) the code-generating computer applies the algorithm using the secret and the current value of the counter as operands to generate a first code that is unique to that secret/counter pair and (2) the EAC device applies the same algorithm to ostensibly the same secret and current value of the counter a second codes that is unique due to that secret/counter pair. In theory the first and second codes are the same. When the code is entered into the EAC device its processor compares the entered code to the code it internally calculated based on it having the same algorithm, secret, and counter value. If the codes match, the EAC device opens/unlocks the target device, such as a latch, shackle, door, gate, locker, cabinet, drawer, or other closure. After the code is generated and used, the counter variable in the code-generating computer and the EAC device both identically indexes forward by one or more which invalidates previously generated codes. In some systems, if the code generated by the code-generating computer does not match the code generated internally by the EAC device, the EAC device will temporarily index the counter and recalculate one or more codes within a window of counter values, e.g., 100 counter values upward and 100 counter values downward and compare each to the code generated by the code-generating computer to try to find a match in case. Once a match is found, the counter value can be updated to the one that generated a matching code.

SUMMARY

The present application discloses systems and methods of providing different functionality to EAC devices using multiple algorithm/operand pairs, each tied to one or more different functions. In exemplary systems, each algorithm/operand pair comprises an algorithm, a rolling code "secret" value, and a rolling code "counter" value.

One exemplary embodiment of the present disclosure relates to an EAC system. The EAC system includes at least one processor having associated memory; an actuator that opens or unlocks the target device, such as a latch, shackle, door, gate, locker, cabinet, drawer, or other closure in response to one or more signals from the processor; a user input device that receives user input and communicates to the at least one processor data corresponding to the user input; the memory having stored thereon code causing the at least one processor to: receive an entered code via the user input device; calculate a first calculated code using a first algorithm/operand pair, and compare the first calculated code to the entered code to determine if the first algorithm/operand pair matches the entered code; and if the first algorithm/operand pair matches the entered code, perform a first EAC function; and if the first algorithm/operand pair does not match the entered code, one of: (a) compare to the entered code a previously determined second calculated code that was calculated using a second algorithm/operand pair to determine if the second algorithm/operand pair matches the entered code; and (b) calculate a second calculated code using a second algorithm/operand pair, and compare the second calculated code to the entered code to determine if the second algorithm/operand pair matches the entered code; and if the second calculated code matches the entered code, perform a second EAC function that is different from the first EAC function.

Another exemplary embodiment of the present disclosure relates to a computer-implemented method of accessing an EAC system. The computer-implemented method includes: receiving an entered code via the user input device of an electronic access control (EAC) system; calculating a first calculated code using a first algorithm/operand pair, and comparing the first calculated code to the entered code to determine if the first algorithm/operand pair matches the entered code; and if the first algorithm/operand pair matches the entered code, performing a first EAC function; and if the first algorithm/operand pair does not match the entered code, one of: (a) comparing to the entered code a previously determined second calculated code that was calculated using a second algorithm/operand pair to determine if the second algorithm/operand pair matches the entered code; and (b) calculating a second calculated code using a second algorithm/operand pair, and compare the second calculated code to the entered code to determine if the second algorithm/operand pair matches the entered code; and if the second algorithm/operand pair matches the entered code, performing a second EAC function that is different from the first EAC function. In exemplary embodiments, at least one of the EAC functions comprises opening or unlocking a target device, such as a latch, shackle, door, gate, locker, cabinet, drawer, or other closure.

Another exemplary embodiment of the present disclosure relates to a computer-implemented method of programming an EAC system. The computer-implemented method includes: communicating to an electronic access control (EAC) system at least a first algorithm/operand pair and at least a first EAC function corresponding to access codes generated using the first algorithm/operand pair; communicating to an electronic access control (EAC) system at least a second algorithm/operand pair different from the first algorithm/operand pair and at least a second EAC function corresponding to access codes generated using the second algorithm/operand pair and different from the first EAC function; and causing the EAC system to write to one or more non-transitory computer readable media of the EAC system at least the first and second algorithm/operand pairs and the first and second EAC functions. In exemplary embodiments, at least one of the EAC functions comprises opening or unlocking a target device, such as a latch, shackle, door, gate, locker, cabinet, drawer, or other closure.

Another exemplary embodiment of the present disclosure relates to a computer-implemented method of generating a code for an EAC system. The computer-implemented method includes: receiving from a user at a code generating computer at least a request for an access code, data indicating the identity of the user, and data indicating a specific electronic access control (EAC) system to be accessed; generating with the code generating computer an access code to access the specific EAC system to be accessed using at least an algorithm/operand pair associated with one of the user and the specific EAC system to be accessed, the algorithm/operand pair being selected by the code generating computer from a plurality of algorithm/operand pairs stored in a non-transitory machine-readable medium of the code generating computer for the specific EAC system to be accessed; and communicating the access code to the user.

DETAILED DESCRIPTION

This Detailed Description merely describes exemplary embodiments of the invention and is not intended to limit the scope of the claims in any way. Indeed, the invention as claimed is broader than the exemplary embodiments, and the terms used in the claims have their full ordinary meaning, unless an express definition is provided herein.

Figure 1:
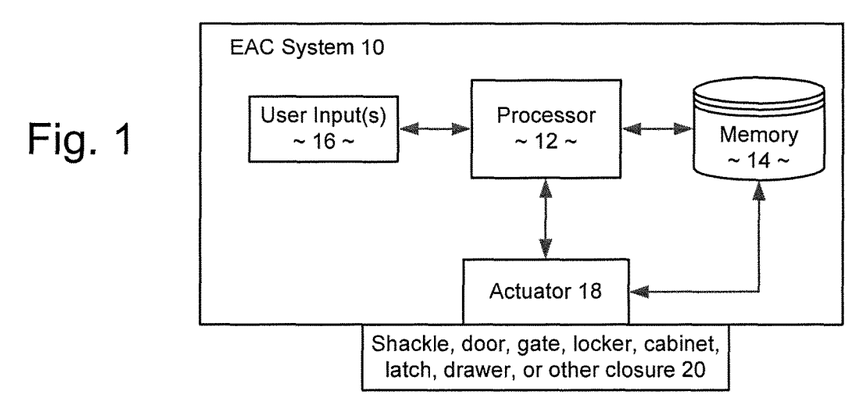
FIG. 1 is a schematic block diagram of an exemplary EAC system having multiple algorithm/operand pairs, each tied to one or more different functions.

Referring now to FIG. 1, a block diagram of an exemplary EAC system 10 is shown. Exemplary EAC system 10 system has multiple algorithm/operand pairs, each tied to one or more different functions. Exemplary EAC system 10 comprises a processor 12 in circuit communication with memory 14, one or more user inputs 16, and one or more actuators 18. "Processor" or "computer" as used herein includes, but is not limited to, any programmed or programmable electronic device or coordinated devices that can store, retrieve, and process data and may be a processing unit or in a distributed processing configuration. Examples of processors include microprocessors, microcontrollers, graphics processing units (GPUs), floating point units (FPUs), reduced instruction set computing (RISC) processors, digital signal processors (DSPs), field programmable gate arrays (FPGAs), etc.

Exemplary actuators 18 include motors, solenoids, electromagnets, etc. used to open, close, lock, unlock, permit manual locking of, or permit manual unlocking of target devices, such as any one or more of latches, shackles, doors, gates, lockers, cabinets, drawers, or other closures 20. In some exemplary EAC systems 10, a motor is used to block or release a pin, catch, flange, or other structure that is affixed to a building door, drawer, locker door, cabinet door, or other closure to lock, unlock, permit manual locking thereof, or permit manual unlocking thereof. In other exemplary EAC systems 10, a solenoid is used to block or release a pin, catch, flange, or other structure that is affixed to a building door, drawer, locker door, cabinet door, or other closure to lock, unlock, permit manual locking thereof, or permit manual unlocking thereof. In exemplary EAC locks 10, a motor 18 is used to secure or release a shackle so that the shackle can be manually moved to unlock the lock and then later re-secure the shackle to lock the lock. In other exemplary EAC systems 10, an electromagnet is used to secure or release a plate or other structure that is affixed to a building door, drawer, locker door, cabinet door, or other closure for locking or unlocking thereof.

Exemplary EAC system 10 has logic for performing the various functions and processes described herein. "Logic," synonymous with "circuit" as used herein includes, but is not limited to, hardware, firmware, software and/or combinations of each to perform one or more functions or actions. For example, based on a desired application or needs, logic may include a software controlled processor, discrete logic such as an application specific integrated circuit (ASIC), programmed logic device, or other processor. Logic may also be fully embodied as software. "Software," as used herein, includes but is not limited to one or more computer readable and/or executable instructions that cause a processor or other electronic device to perform functions, actions, processes, and/or behave in a desired manner. The instructions may be embodied in various forms such as routines, algorithms, modules or programs including separate applications or code from dynamically linked libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. It will be appreciated by one of ordinary skill in the art that the form of software is dependent on, for example, requirements of a desired application, the environment it runs on, and/or the desires of a designer/programmer or the like. In exemplary embodiments, some or all of the software is stored on memory 14, which includes one or more non-transitory computer readable media of one or more local or remote data storage devices (for remote memories, system 10 will include a communications circuit, not shown). As used herein, "data storage device" means a device for non-transitory storage of code or data, e.g., a device with a non-transitory computer readable medium. As used herein, "non-transitory computer readable medium" mean any suitable non-transitory computer readable medium for storing code or data, such as a magnetic medium, e.g., fixed disks in external hard drives, fixed disks in internal hard drives, and flexible disks; an optical medium, e.g., CD disk, DVD disk, and other media, e.g., ROM, PROM, EPROM, EEPROM, flash PROM, external flash memory drives, etc.

In exemplary systems, a user will open or unlock a target device (such as a latch, shackle, doors, gate, locker, cabinet, drawer, or other closure 20) by inputting data via the one or more user inputs 16. User input 16 can include any one or more of buttons, keyboards, keys, touchpads, touchscreens, and associated support chips, and/or one or more communication circuits (e.g., RS-232 or USB) for an external keyboard or other external user input device, such as a card reader, keyboard, keypad, mouse, track pad, or other pointing device, or other user input devices. In exemplary systems 10, a user input 16 comprises a display circuit (not shown) including any one or more of LEDs, NxM textual displays, matrix displays on which a graphical user interface ("GUI") can be presented, e.g., a color or monochrome liquid crystal display ("LCD") or organic light-emitting diode ("OLED") display, with associated drive chips, and/or one or more graphics circuits (e.g., VGA or HDMI) for an external display, or other displays. A user credential, such as a passcode, can be entered by a user using any of the foregoing. As used herein, a "credential" comprises data that authorizes a user to perform an EAC function. Exemplary credentials include passwords, generated changing codes, such as rolling codes, biometrics (fingerprints, voice recognition, retinal scans), public key certificates, and so on. In the alternative, a credential can be read from a card using a connected card reader acting as a user input device 16.

User input 16 can also include one or more receiver circuits such as RF receivers, infrared receivers, etc. for receiving a code from a user via a wireless signal such as an infrared signal or an RF signal. For example, in exemplary systems, a user can use a so-called smart phone to communicate a code to the EAC system 10 using an RF signal, e.g., a Bluetooth signal, a Wi-Fi signal, an NFC signal, or some other signal. In exemplary embodiments, the smart phone both generates the code in response to user input and transmits the code to the EAC system 10. In other exemplary embodiment, the smart phone is simply a conduit between a remote computer and the EAC system 10, e.g., receiving an SMS message with the code, displaying that to a user, and transmitting the code to the EAC system 10. In other exemplary systems, a user can use a programmed transmitter, such as a garage door transmitter or car key fob type device, to communicate a code to the EAC system 10 using an RF signal.

User input 16 can also include one or more biometric sensors, e.g., fingerprint readers, retinal scanners, microphones for voice prints, etc. for user verification. If such sensors are present, processor 12 will have corresponding logic to analyze the biometric data and indicate whether the data is valid or not, e.g., fingerprint analysis logic and comparison logic, retina analysis logic and comparison logic, voice print analysis logic and comparison logic, etc. Such biometric data also can be used alone as an operand or in conjunction with user passwords and/or other biometric data to verify a user's ability to open or unlock the target device, such as a latch, shackle, doors, gate, locker, cabinet, drawer, or other closure 20.

Figure 2:
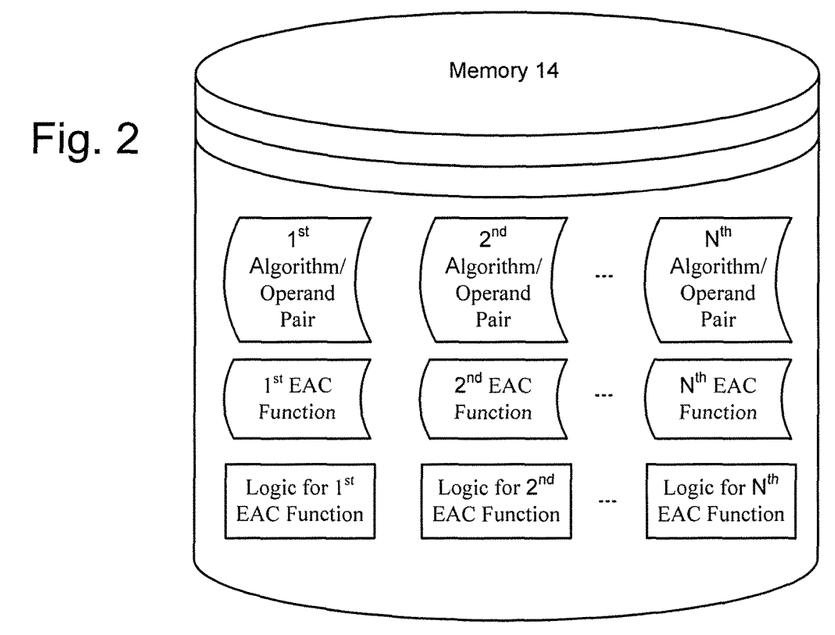
FIG. 2 is a schematic diagram of an exemplary non-transitory computer readable media providing different functionality to an EAC device using multiple algorithm/operand pairs, each tied to one or more different functions.

Referring now to FIG. 2, an exemplary EAC memory 14 is shown. Memory 14 includes one or more non-transitory computer readable media of one or more local or remote data storage devices having stored thereon (or having a pointer thereto stored thereon) at least: a plurality of algorithm/operand pairs, a plurality of associated EAC functions, and logic for performing the associated EAC functions. "Pointer" and "point to" as used herein in connection with data or software include, but are not limited to, storing on a non-transitory computer readable media of a data storage device one or more data indicating the location on another data storage device from where the data or software can be downloaded or otherwise accessed. "Operand" as used herein means one or more quantities on which an operation is to be done, such as one or more quantities on which a mathematical operation is performed. For example, one or more seeds used by a cryptographic algorithm are an "operand" or "operands" herein. "Algorithm/operand pair" as used herein means one or more specific algorithms paired with one or more specific operands for the algorithm(s). In exemplary embodiments, each specific algorithm/operand pair repeatedly generates an identical result.

In exemplary embodiments, a first rolling code secret/counter pair used as inputs to a hash algorithm such as SHA-1 (e.g., FIPS PUB 180-2 compliant) forms a first specific algorithm/operand pair and a second, different rolling code secret/counter pair used as inputs to the same hash algorithm such as SHA-1 forms a second specific algorithm/operand pair. In other exemplary embodiments, a rolling code secret/counter pair used as inputs to a first hash algorithm such as SHA-1 forms a first specific algorithm/operand pair and the same rolling code secret/counter pair used as inputs to a second, different hash algorithm such as one of the SHA-2 hash functions forms a second specific algorithm/operand pair. "Rolling code secret/counter pair" as used herein refers to a fixed constant (the "secret" portion of the pair) and a variable value (the "counter" portion of the pair) that can be used to generate rolling codes using hash functions and other cryptographic functions. A cryptographic hash function is a hash function which is considered practically impossible to invert, that is, to recreate the input data from its hash value alone. A hash function is any function that can be used to map data of arbitrary size to data of fixed size, with slight differences in input data producing very big differences in output data. In exemplary embodiments, a user enters one or more operands using user input 16, e.g., typing in one or more codes or swiping one or more cards from which one or more operands are read. In the alternative, or in addition thereto, in exemplary systems, biometric parameters are operands.

In FIG. 2, each algorithm/operand pair has a corresponding EAC function and the system 10 also includes logic for performing the associated EAC function. An "EAC function" as used herein means a function associated with an EAC system and/or credentials used in connection with an EAC system. Exemplary EAC functions include:

1. Responsive to a user presenting a code matching a code generated by the associated algorithm/operand pair, automatically opening, unlocking, or permitting manual unlocking of target devices, such as any one or more of latches, shackles, doors, gates, lockers, cabinets, drawers, or other closures 20 and leaving them open or unlocked indefinitely (i.e., until it is manually closed or locked).
2. Responsive to a user presenting a code matching a code generated by the associated algorithm/operand pair, automatically closing, locking, or permitting manual locking of target devices, such as any one or more of latches, shackles, doors, gates, lockers, cabinets, drawers, or other closures 20.
3. Responsive to a user presenting a code matching a code generated by the associated algorithm/operand pair, automatically opening, unlocking, or permitting manual unlocking of target devices, such as any one or more of latches, shackles, doors, gates, lockers, cabinets, drawers, or other closures 20 and leaving them open or unlocked for a period of time corresponding to the associated algorithm/operand pair (and then automatically closing and/or relocking them). In exemplary systems, different algorithm/operand pairs permit a longer or shorter open/unlock time. For example, an ordinary worker algorithm/operand pair might permit a relatively short open/unlock time on the order of a few minutes or seconds and a maintenance worker algorithm/operand pair might permit a longer open/unlock time on the order of a an hour or more.

4. Responsive to a user presenting a code matching a code generated by the associated algorithm/operand pair, automatically opening, unlocking, or permitting manual unlocking of target devices, such as any one or more of latches, shackles, doors, gates, lockers, cabinets, drawers, or other closures 20 only if the current time period matches a first predetermined time period associated with the entered algorithm/operand pair. In exemplary systems, different algorithm/operand pairs permit different target time periods, such as predetermined hours of predetermined days. For example, a first worker algorithm/operand pair might permit opening/unlocking only during a specific work shift Monday through Friday, e.g., 6:00 am through 3:00 pm and a second worker algorithm/operand pair might permit opening/unlocking only during a different specific work shift Monday through Friday, e.g., 3:00 pm through midnight.

5. Responsive to a user presenting a code matching a code generated by the associated algorithm/operand pair, automatically opening, unlocking, or permitting manual unlocking of target devices, such as any one or more of latches, shackles, doors, gates, lockers, cabinets, drawers, or other closures 20 and also writing a parameter to an electronic key presented to the electronic access control system via a reader/writer, the parameter permitting subsequent accesses via the electronic key.

6. Responsive to a user presenting a code matching a code generated by the associated algorithm/operand pair, automatically opening, unlocking, or permitting manual unlocking of target devices, such as any one or more of latches, shackles, doors, gates, lockers, cabinets, drawers, or other closures 20 and also writing a refreshed time stamp to an electronic key presented to the electronic access control system via a writer, the refreshed time stamp permitting subsequent accesses via the electronic key.

In exemplary embodiments, memory 14 has stored thereon computer code causing the processor 12 to perform any two or any three or more of the various EAC functions (and the other functions) discussed herein.

Figure 3:
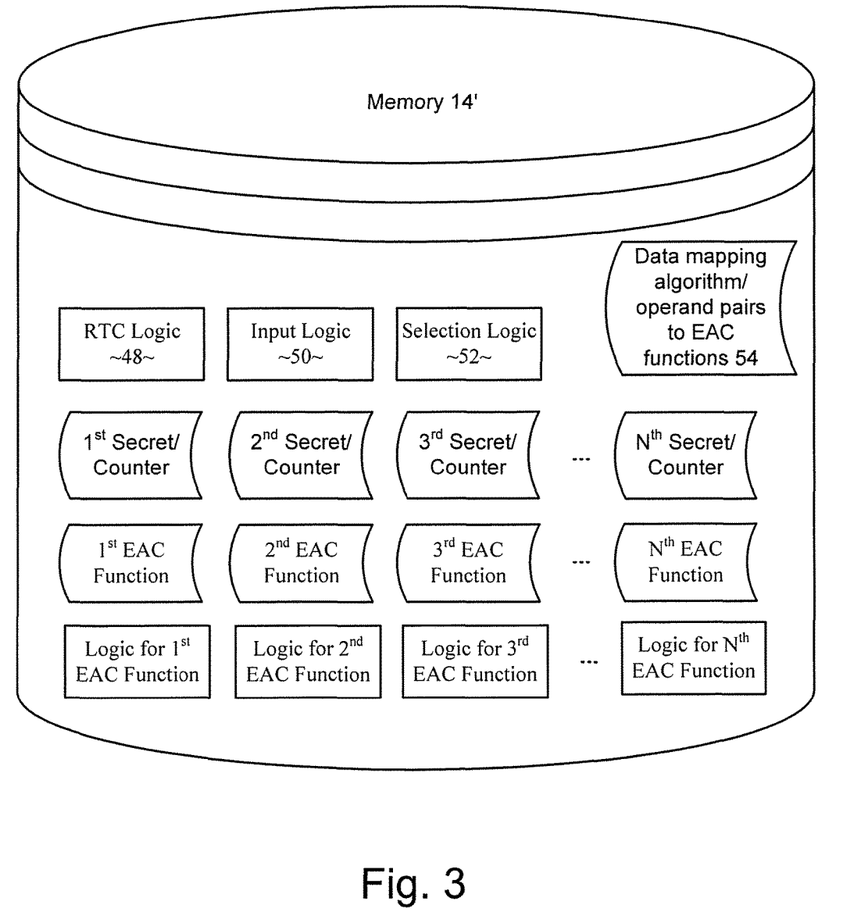
FIG. 3 is a schematic diagram of another exemplary non-transitory computer readable media providing different functionality to an EAC device using multiple algorithm/operand pairs, each tied to one or more different functions.

Referring now to FIG. 3, an exemplary memory 14' of an exemplary implementation of EAC system 10 is shown. In the exemplary implementation, the same algorithm (e.g., SHA-1) is used for each algorithm/operand pair; accordingly the different algorithm/operand pairs are simply stored as different operands, in this case different rolling code "secret" and "counter" values. The first EAC function has first rolling code "secret" and "counter" values associated therewith, second EAC function has second, different rolling code "secret" and "counter" values associated therewith, third EAC function has third different rolling code "secret" and "counter" values associated therewith, and the Nth EAC function has different Nth rolling code "secret" and "counter" values associated therewith. The EAC functions can be any EAC function, such as the various EAC functions described herein, such as (a) opening/unlocking for an indefinite period of time, (b) opening/unlocking for a predetermined period of time, (c) opening/unlocking for a predetermined period of time only if real-time clock (RTC) logic 48 (FIG. 3) and/or calendar logic implemented in the EAC system 10 (either in hardware alone, software alone, or a combination of hardware and software) indicates that the day and time of day is within a predetermined window, e.g., only Monday through Friday 7:00 AM to 7:00 PM for one shift or 7:00 PM to 7:00 AM for a different shift, (d) opening/unlocking and refreshing one or more credentials, such as a timestamp, (e) simply refreshing one or more credentials, such as a timestamp, (f) writing one or more credentials to a memory thereby activating an EAC key, and/or (g) disabling a rolling code counter from incrementing, thereby making converting a rolling code into a fixed, static code, e.g., an emergency passcode. Accordingly, the memory 14' will have stored thereon computer code causing the processor 12 to perform a corresponding EAC function when a code corresponding to a particular set of rolling code "secret" and "counter" values is entered into user input 16.

In exemplary embodiments, each rolling code "counter" value has a code "look ahead" window, which is a range of codes the product will accept in relation to its current counter and helps keep the EAC system and the code-generating computer in synch with respect to the rolling code "counter" values. The larger the look ahead window, the more valid codes there are for a product at a given time so at some point security is decreased (a window of a thousand values above and below a given counter value provides two thousand additional values that if guessed and entered will open/unlock). The range can be ahead and/or behind where the current rolling code "counter" value is. Typically an EAC system 10 will set its "counter" to match the highest count code that has been entered in the acceptable range, thus keeping the two in synch. In real-time systems, when a code is entered into an EAC system 10, it must calculate each of the codes in its window until a gets a match. This may lead to time delays at the product level for large windows and many codes. Accordingly, in the alternative, the codes for windows around each current rolling code "counter" value can be pre-calculated, e.g., right after a rolling code "counter" value increments, e.g., after the rolling code "counter" value increments, the processor 12 calculates one hundred codes, one for each hypothetical increment of the rolling code "counter" value.

Figure 4:
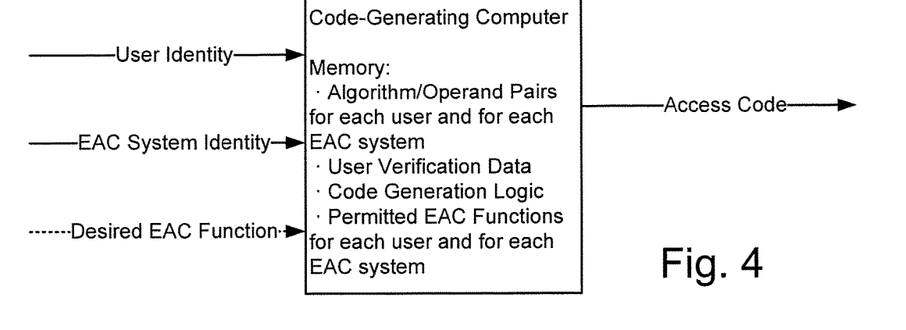
FIG. 4 is a schematic flow diagram showing various inputs and outputs for an exemplary code-generating computer.

The exemplary implementation of EAC system 10 with memory 14' has a user input 16 permitting a user to enter a several digit numeric code via input logic 50. The entered code can be a rolling code generated by a code-generating computer (e.g., a central computer or a handheld computer) using the same algorithm in response to user input into the code-generating computer, such as (a) data identifying the user, (b) data identifying the shackle, door, gate, locker, cabinet, latch, drawer, or other closure 20, and (c) a credential (such as a PIN) indicating that the user is permitted to receive codes to open that particular shackle, door, gate, locker, cabinet, latch, drawer, or other closure 20, and, optionally, (d) a specific EAC function to perform (FIG. 4). Thus, the code-generating computer receives from a user at least a request for an access code, data indicating the identity of the user, and data indicating a specific electronic access control (EAC) system to be accessed; generates an access code to access the specific EAC system to be accessed using at least an algorithm/operand pair associated with the user and/or the specific EAC system to be accessed, the algorithm/operand pair selected by the code generating computer from a plurality of algorithm/operand pairs stored in a non-transitory machine-readable medium of the code generating computer for the specific EAC system to be accessed; and communicates the access code to the user.

Some users will be permitted to only use one EAC function, such as opening/unlocking for e predetermined period of time only if RTC logic 48 indicates that the day and time of day is within a predetermined window. In exemplary systems, the code-generating computer is programmed with code to determine which code to provide a user based on the user's ID and the location of the EAC system the user desires to access. The code can be transmitted to the user by the code-generating computer (FIG. 4), e.g., via an SMS or MMS message, e-mail, etc., or otherwise communicated to the user, e.g., via screen portion of the code-generating computer.

In response to the user entering a several digit numeric code into EAC system 10 via input logic 50, selection logic 52 in EAC system 10 determines which EAC function, if any, to perform. In this exemplary embodiment, selection logic 52 calculates a code using the first rolling code "secret" and "counter" values and compares the generated code to the code entered via the user interface 16. If there is a match, EAC system 10 performs the first EAC function using corresponding logic based on data mapping the algorithm/operand pairs to EAC functions 54. If the internally generated code does not match the code entered via the user interface 16, the selection logic 52 sequentially searches for a match in a predetermined window of values around the first "counter" value, such as a window 100 forward and zero backward with respect to the current value. If any of those match, EAC system 10 performs the first EAC function using corresponding logic based on data mapping the algorithm/operand pairs to EAC functions 54. If none of the internally generated codes using the window around the "counter" match the code entered via the user interface 16, the selection logic 52 searches for a match using the second rolling code "secret" and "counter" values. More specifically, selection logic 52 calculates a code using the second rolling code "secret" and "counter" values and compares the generated code to the code entered via the user interface 16. If there is a match, EAC system 10 performs the second EAC function using corresponding logic based on data mapping the algorithm/operand pairs to EAC functions 54. If the internally generated code does not match the code entered via the user interface 16, the selection logic 52 sequentially searches for a match in a predetermined window of values around the second "counter" value, such as a window 100 forward and zero backward with respect to the current value. If any of those match, EAC system 10 performs the second EAC function using corresponding logic based on data mapping the algorithm/operand pairs to EAC functions 54. If none of the internally generated codes using the window around the second "counter" match the code entered via the user interface 16, the selection logic 52 searches for a match using the third rolling code "secret" and "counter" values. More specifically, selection logic 52 calculates a code using the third rolling code "secret" and "counter" values and compares the generated code to the code entered via the user interface 16. If there is a match, EAC system 10 performs the third EAC function using corresponding logic based on data mapping the algorithm/operand pairs to EAC functions 54. If the internally generated code does not match the code entered via the user interface 16, the selection logic 52 sequentially searches for a match in a predetermined window of values around the third "counter" value, such as a window 100 forward and zero backward with respect to the current value. If any of those match, EAC system 10 performs the third EAC function using corresponding logic based on data mapping the algorithm/operand pairs to EAC functions 54. If none of the internally generated codes using the window around the third "counter" match the code entered via the user interface 16, the selection logic 52 searches for a match using the fourth rolling code "secret" and "counter" values. More specifically, selection logic 52 calculates a code using the fourth rolling code "secret" and "counter" values and compares the generated code to the code entered via the user interface 16. If there is a match, EAC system 10 performs the fourth EAC function using corresponding logic based on data mapping the algorithm/operand pairs to EAC functions 54. If the internally generated code does not match the code entered via the user interface 16, the selection logic 52 sequentially searches for a match in a predetermined window of values around the fourth "counter" value, such as a window 100 forward and zero backward with respect to the current value. If any of those match, EAC system 10 performs the fourth EAC function using corresponding logic based on data mapping the algorithm/operand pairs to EAC functions 54. If none of the internally generated codes using the window around the fourth "counter" match the code entered via the user interface 16, the selection logic 52 searches for a match using the fifth rolling code "secret" and "counter" values. More specifically, selection logic 52 calculates a code using the fifth rolling code "secret" and "counter" values and compares the generated code to the code entered via the user interface 16. If there is a match, EAC system 10 performs the fifth EAC function using corresponding logic based on data mapping the algorithm/operand pairs to EAC functions 54. If the internally generated code does not match the code entered via the user interface 16, the selection logic 52 sequentially searches for a match in a predetermined window of values around the fifth "counter" value, such as a window 100 forward and zero backward with respect to the current value. If any of those match, EAC system 10 performs the fifth EAC function using corresponding logic based on data mapping the algorithm/operand pairs to EAC functions 54. If none of the internally generated codes using the window around the fifth "counter" match the code entered via the user interface 16, the selection logic 52 continues searching a match using any other rolling code "secret" and "counter" values. If none of the programmed rolling code "secret" and "counter" values (and windows around the "counter" values) generates a match, the selection logic 52 can either simply do nothing or optionally indicate to the user, e.g., with a visual and/or an audible indication, that the entered code does not match. Obviously, if the EAC system 10 only has two EAC functions and corresponding rolling code "secret" and "counter" values, the selection logic 52 will only search for match using codes generated by those two rolling code "secret" and "counter" values (and windows around the "counter" values) before ceasing searching for a match.

In the foregoing, rolling code "counter" values are advanced or "rolled" ahead when a certain parameter or a combination of parameters are met. In exemplary embodiments, the counters are event driven (a user requests a code which causes the counter go to its next increment) and/or time based (a counter goes to its next increment on a specific time or time period of time).

In the foregoing, the same rolling code "secret" can be used in multiple EAC devices 10 (presumably they will have independent counters that are separately tracked by the code-generating computer). Similarly, if the counter is relatively large, e.g., 32-bits, in addition to using the same algorithm in a particular EAC system 10, the algorithm/ operand pairs can have the same "secret" in which case the algorithm/operand pairs can be defined by their respective the "counter" values.

In exemplary systems, user-set codes can be entered and stored in memory 14, 14'. For example, one algorithm/operand pair can be associated with putting the EAC system such as a padlock or a locker into a Commercial Back-to-School (BTS) mode: the EAC system will not lock without a particular user set code.

In all of the foregoing, EAC functions can have a plurality of different characteristics, such as valid for X number of uses, valid for Y period of time, valid until changed, etc.

Similarly, in the foregoing, codes can be set-up in levels with higher levels possibly overriding lower levels, such as admin codes, manager codes, and ordinary user codes, etc. For example, Commercial BTS logic can be implemented as follows: a manager code opens a lock at any time; a lock opened by a manager code can be closed without resetting the user set pass code; and a lock opened by a manager code can have the user code deleted.

In exemplary embodiments, admin codes or configuration codes can allow for changing/setting certain parameters, such as resetting dates/times, manually changing code counters, setting fixed codes, erasing fixed codes, etc.

The specific code length and the number of characters per code position is not critical; different systems will use different code lengths and numbers of characters per code position. For example, a system with a numerical (0-9) user input 16 might have a shorter code than a system with a directional (up-down-left-right (0-3)) user input 16.

In exemplary embodiments, the RTC logic 48 is used to roll the current rolling code "counter" values, erase user set codes, etc.

In various embodiments, code use logic can be defined in several ways, such as time-based, use-based, request-based, and/or non-request-based. Exemplary time-based codes are valid for a certain period of time after it is first used or issued. In the alternative, time-based are valid only for a certain time period of the day based on the RTC logic 48. Exemplary use-based codes are valid for a certain number of uses. Exemplary request-based codes must be requested by a code-generating computer each time the EAC system 10 is used, which can be used to initiate audit trail creation and can be used to trigger other events like alarm suppression, lights, video etc. Such codes are not necessarily a one-time code; rather, other code logic will make the code invalid between typical uses. Exemplary non-request-based codes need not be requested from a code-generating computer for each access. Exemplary non-request-based codes are valid until changed by some other use logic. In these applications the codes are typically provided by a manager or admin who manages the interaction with the code-generating computer.

Figure 5:
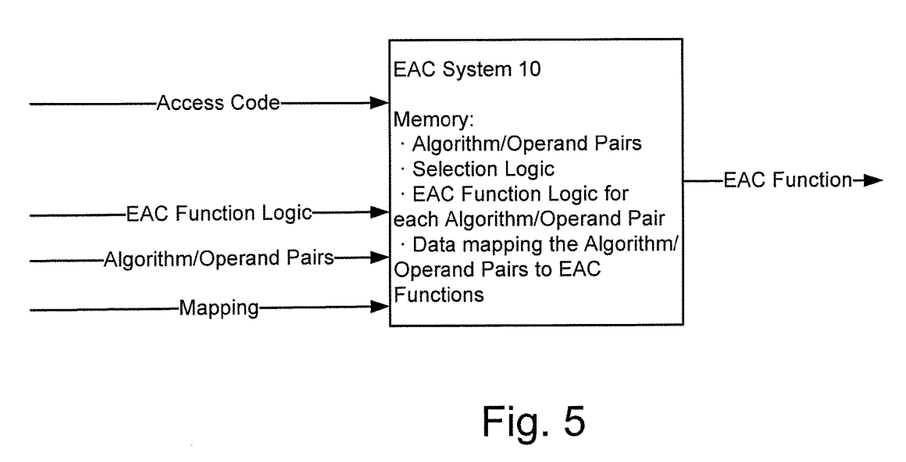
FIG. 5 is a schematic flow diagram showing various inputs and outputs for an exemplary EAC system.

Exemplary EAC systems 10 will be pre-programmed with the algorithm/operand pairs, associated EAC functions, and mapping of the algorithm/operand pairs to associated EAC functions (FIG. 5) by transmitting the algorithm/operand pairs and associated EAC functions to the EAC system 10 and causing the EAC system 10 to write them to non-volatile memory. For example, in programming an EAC system 10, an exemplary method includes: communicating to the EAC system 10 a first algorithm/operand pair and a first EAC function corresponding to access codes generated using the first algorithm/operand pair, communicating to the EAC system 10 a second algorithm/operand pair and a second EAC function corresponding to access codes generated using the second algorithm/operand pair, and causing the EAC system 10 to write to one or more non-transitory computer readable media of the EAC system at least the first and second algorithm/operand pairs and the first and second EAC functions. An EAC system 10 pre-programmed in this way will simply execute one or more EAC functions (or not) in response to a code being entered (FIG. 5).

Some of the steps, acts, and other processes and portions of processes are described herein as being done "automatically." In the alternative, or in addition thereto, those steps, acts, and other processes and portions of processes can be done with one or more intervening human acts or other manual acts that eventually trigger the mentioned step(s), act(s), and/or other process(es) and/or process portion(s).

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, although the embodiments herein are described in the context of an EAC system having a physical shackle, door, gate, locker, cabinet, latch, drawer, or other closure 20, those skilled in the art will appreciate that the teachings herein apply equally well to computer systems without such structure and the multiple codes herein can be used to perform various data access functions pertaining to data access such as: permitting a user to access data from and/or log into one server or set of servers with one rolling code based on a first algorithm/operand pair; and/or permitting a user to access data from and/or log into a different server or set of servers with a different rolling code based on a second algorithm/operand pair; and/or permitting a user to refresh a credential with a different rolling code based on a third algorithm/operand pair. As another example, the steps of all processes and methods herein can be performed in any order, unless two or more steps are expressly stated as being performed in a particular order, or certain steps inherently require a particular order. Accordingly, departures may be made from such details without departing from the spirit or scope of the applicant's general inventive concept.

What is claimed is:

1. An electronic access control system, comprising:
   at least one processor having associated memory;
   an actuator that unlocks a closure for an opening in response to one or more signals from the processor;
   a user input device that receives user input and communicates to the at least one processor data corresponding to the user input;
   the memory having stored thereon code causing the at least one processor to:
      receive an entered code via the user input device;
      calculate a first calculated code using a first algorithm/operand pair, and compare the first calculated code to the entered code to determine if the first algorithm/operand pair matches the entered code; and
      if the first algorithm/operand pair matches the entered code, perform a first EAC function; and
      if the first algorithm/operand pair does not match the entered code, one of:
         (a) compare to the entered code a previously determined second calculated code that was calculated using a second algorithm/operand pair to determine if the second algorithm/operand pair matches the entered code; and
         (b) calculate a second calculated code using a second algorithm/operand pair, and compare the second calculated code to the entered code to determine if the second algorithm/operand pair matches the entered code; and if the second calculated code matches the entered code, perform a second EAC function that is different from the first EAC function; and wherein the first algorithm/operand pair comprises a cryptographic algorithm and a first operand and the second algorithm/operand pair comprises the same cryptographic algorithm and a second operand that is different from the first operand; and wherein the actuator comprises one of (a) an actuator selected from the group of a motor, solenoid, and electromagnet that unlocks one of a latch, shackle, door, building door, locker door, cabinet door, gate, locker, cabinet, or drawer and (b) an actuator selected from the group of a motor and a solenoid that releases one of a pin, catch, of flange that is affixed to a door, building door, drawer, locker door, or cabinet door to unlock or permit manual unlocking thereof.

2. The electronic access control system according to claim 1, wherein the first and second operands each comprise a fixed value and a value that changes over time; wherein the first operand comprises a first fixed value and an initial value for a first value that changes responsive to a predetermined condition being met; and wherein the second operand comprises a second fixed value and an initial value for a second value that changes responsive to a predetermined condition being met.

3. The electronic access control system according to claim 2, wherein the at least one processor performing the first EAC function comprises the at least one processor unlocking the closure and fixing the first value so the first value no longer changes responsive to the predetermined condition being met, thereby converting the first calculated code into an unchanging code, and wherein the at least one processor performing the second EAC function comprises the at least one processor unlocking the closure without fixing the first value so the first value no longer changes responsive to the predetermined condition being met.

4. The electronic access control system according to claim 1, wherein the first and second operands each comprise a fixed value and a value that changes responsive to subsequent accesses; wherein the first operand comprises a first fixed value and an initial value for a first value that responsive to subsequent accesses; and wherein the second operand comprises a second fixed value and an initial value for a second value that responsive to subsequent accesses.

5. The electronic access control system according to claim 4, wherein the at least one processor performing the first EAC function comprises the at least one processor unlocking the closure and fixing the first value so the first value no longer changes responsive to subsequent accesses, thereby converting the first calculated code into an unchanging code, and wherein the at least one processor performing the second EAC function comprises the at least one processor unlocking the closure without fixing the first value so the first value no longer changes responsive to subsequent accesses.

6. The electronic access control system according to claim 1, wherein the first algorithm/operand pair comprises a first cryptographic algorithm and a first operand and the second algorithm/operand pair comprises a second cryptographic algorithm that is different from the first cryptographic algorithm and a second operand that is the same as or different from the first operand.

7. The electronic access control system according to claim 1, wherein the user input device comprises a plurality of keys used to enter the entered code.

8. The electronic access control system according to claim 2, wherein any one or a combination of any two or more of the following:

wherein the at least one processor performing the first EAC function comprises the at least one processor unlocking the closure and leaving the closure unlocked for a first period of time and then automatically locking the closure, and wherein the at least one processor performing the second EAC function comprises the at least one processor unlocking the closure and leaving the closure unlocked for a second period of time and then automatically locking the closure;

wherein the at least one processor performing the first EAC function comprises the at least one processor unlocking the closure and leaving the closure unlocked for a period of time and then automatically locking the closure, and wherein the at least one processor performing the second EAC function comprises the at least one processor unlocking the closure and leaving the closure unlocked until the closure is manually locked by the at least one processor;

wherein the at least one processor performing the first EAC function comprises the at least one processor unlocking the closure and leaving the closure unlocked for a period of time and then automatically locking the closure, and wherein the at least one processor performing the second EAC function comprises the at least one processor unlocking the closure and leaving the closure unlocked until the closure is manually locked by the at least one processor in response to input via the user input device;

wherein the at least one processor performing the first EAC function comprises the at least one processor unlocking the closure only if the current time period matches a first predetermined time period associated with the first algorithm/operand pair, and wherein the at least one processor performing the second EAC function comprises the at least one processor unlocking the closure only if the current time period matches a second predetermined time period associated with the second algorithm/operand pair, the second predetermined time period being different from the first predetermined time period;

wherein the at least one processor performing the first EAC function comprises the at least one processor unlocking the closure and writing a parameter to an electronic key presented to the electronic access control system via a writer, the parameter permitting subsequent accesses via the electronic key, and wherein the at least one processor performing the second EAC function comprises the at least one processor unlocking the closure without writing a parameter to an electronic key presented to the electronic access control system permitting subsequent accesses via the electronic key;

wherein the at least one processor performing the first EAC function comprises the at least one processor writing a refreshed time stamp to an electronic key presented to the electronic access control system via a writer, the refreshed time stamp permitting subsequent accesses of one or both of the closure and another closure via the electronic key, and wherein the at least one processor performing the second EAC function comprises the at least one processor unlocking the closure without writing a parameter to an electronic key presented to the electronic access control system permitting subsequent accesses via the electronic key; and wherein the at least one processor performing the first EAC function comprises the at least one processor unlocking the closure and writing a refreshed time stamp to an electronic key presented to the electronic access control system via a writer, the refreshed time stamp permitting subsequent accesses of one or both of the closure and another closure via the electronic key, and wherein the at least one processor performing the second EAC function comprises the at least one processor unlocking the closure without writing a parameter to an electronic key presented to the electronic access control system permitting subsequent accesses via the electronic key.

9. The electronic access control system according to claim 2, wherein if the first and second algorithm/operand pairs do not match the entered code, one of:
(a) compare to the entered code a previously determined third calculated code that was calculated using a third algorithm/operand pair to determine if the third algorithm/operand pair matches the entered code; and
(b) calculate a third calculated code using a third algorithm/operand pair, and compare the third calculated code to the entered code to determine if the third algorithm/operand pair matches the entered code; and
if the third calculated code matches the entered code, perform a third EAC function that is different from the first and second EAC functions.

10. The electronic access control system according to claim 9, wherein if the first, second, and third algorithm/operand pairs do not match the entered code, one of:
(a) compare to the entered code a previously determined fourth calculated code that was calculated using a fourth algorithm/operand pair to determine if the fourth algorithm/operand pair matches the entered code; and
(b) calculate a fourth calculated code using a fourth algorithm/operand pair, and compare the fourth calculated code to the entered code to determine if the fourth algorithm/operand pair matches the entered code; and
if the fourth calculated code matches the entered code, perform a fourth EAC function that is different from the first, second, and third EAC functions.

11. The electronic access control system according to claim 10, wherein if the first, second, third, and fourth algorithm/operand pairs do not match the entered code, one of:
(a) compare to the entered code a previously determined fifth calculated code that was calculated using a fifth algorithm/operand pair to determine if the fifth algorithm/operand pair matches the entered code; and
(b) calculate a fifth calculated code using a fifth algorithm/operand pair, and compare the fifth calculated code to the entered code to determine if the fifth algorithm/operand pair matches the entered code; and
if the fifth calculated code matches the entered code, perform a fifth EAC function that is different from the first, second, third, and fourth EAC functions.

12. The electronic access control system according to claim 2, wherein the first calculated code is pre-calculated before the entered code is received.

13. The electronic access control system according to claim 2, wherein the first calculated code is calculated in real time after the entered code is received via the user input device.

14. The electronic access control system according to claim 2, wherein a plurality of different first calculated codes using the first algorithm/operand pair are pre-calculated before the entered code is received via the user input device and are sequentially compared to the entered code after the entered code is received via the user input device to determine if the first algorithm/operand pair matches the entered code.

15. The electronic access control system according to claim 2, wherein a plurality of different second calculated codes using the second algorithm/operand pair are pre-calculated before the entered code is received via the user input device and are sequentially compared to the entered code after the entered code is received via the user input device to determine if the second algorithm/operand pair matches the entered code.

16. The electronic access control system according to claim 1, wherein the electronic access control system comprises a lock having a shackle and further wherein the actuator comprises a motor used to release the shackle so that the shackle can be manually moved to unlock the lock.

* * * * *